(12) United States Patent
Pav et al.

(10) Patent No.: US 10,367,302 B2
(45) Date of Patent: Jul. 30, 2019

(54) CABLE RETENTION SYSTEM

(71) Applicant: Dell Products L.P., Round Rock, TX (US)

(72) Inventors: Darren Burke Pav, Round Rock, TX (US); James Trevor Goulding, Hillsboro, OR (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 15/800,638

(22) Filed: Nov. 1, 2017

(65) Prior Publication Data

US 2019/0131741 A1  May 2, 2019

(51) Int. Cl.

| H01R 12/70 | (2011.01) |
|---|---|
| H01R 13/639 | (2006.01) |
| H01R 13/58 | (2006.01) |
| H01R 12/79 | (2011.01) |
| H01R 13/645 | (2006.01) |
| H01R 13/64 | (2006.01) |
| H01R 13/642 | (2006.01) |
| H01R 13/629 | (2006.01) |

(52) U.S. Cl.
CPC ........ *H01R 13/639* (2013.01); *H01R 12/7005* (2013.01); *H01R 12/7052* (2013.01); *H01R 12/79* (2013.01); *H01R 13/5812* (2013.01); *H01R 13/629* (2013.01); *H01R 13/64* (2013.01); *H01R 13/642* (2013.01); *H01R 13/6453* (2013.01)

(58) Field of Classification Search
CPC ............ H01R 12/7005; H01R 12/7052; H01R 13/629; H01R 13/64; H01R 13/642; H01R 13/6453

USPC .................................................. 439/378, 374
See application file for complete search history.

(56) References Cited

U.S. PATENT DOCUMENTS

| 4,105,275 | A | * | 8/1978 | Dixon ..................... H01R 23/68 361/785 |
|---|---|---|---|---|
| 4,842,543 | A | * | 6/1989 | Davis .................... H01R 13/645 439/246 |
| 7,258,569 | B1 | | 8/2007 | Johnson et al. |
| 7,438,582 | B2 | | 10/2008 | Taylor |
| 8,408,921 | B2 | * | 4/2013 | Sun ......................... H05K 3/361 361/759 |
| 8,608,501 | B2 | | 12/2013 | Sun |
| 2014/0349513 | A1 | * | 11/2014 | Mathews ............. H01R 12/675 439/470 |

* cited by examiner

*Primary Examiner* — Abdullah A Riyami
*Assistant Examiner* — Justin M Kratt
(74) *Attorney, Agent, or Firm* — Haynes and Boone, LLP (57) ABSTRACT

A cable retention subsystem includes a frame member and at least one board coupling member that is located on the frame member and couples the frame member to a board. A frame alignment member is located on the frame member and aligns a cable connector included on a cable subsystem with a board connector included on the board when the frame alignment member is engaged with a cable alignment member included on the cable connector. The cable retention subsystem also includes at least one frame retention member located on the frame member that engages with the cable connector when the cable connector is coupled with the board connector, and resists movement of the cable connector in a direction that is substantially perpendicular to the board.

17 Claims, 7 Drawing Sheets

CABLE RETENTION SYSTEM

BACKGROUND

The present disclosure relates generally to information handling systems, and more particularly to a cable retention system for an information handling system.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, server devices, networking devices, storage devices, and/or other computing devices, often include cables that couple together their various components. Cables come in many shapes and sizes. For example, flexible flat cables (FFCs) and flexible printed circuits (FPCs) are cables that are both extremely thin and flexible. FFCs and often found in high-density electronic applications like laptops, cell phones, tablets, DVD players, appliances, printers, scanners, televisions, servers, switches, medical devices, and/or a variety of other applications that require cables with relatively high flexibility. FFCs are often used in place of round cables because of their smaller form factor, light weight, Electromagnetic Interference/Radio-Frequency Interference (EMI/RFI) suppression, and elimination of wire-coupling issues. Due to these advantages, connectors on the FFCs are small, have reduced stiffness, and often are configured for zero insertion force (ZIF) or low insertion force (LIF) connections. As such, discerning when an FFC connector is oriented and/or installed correctly with its mating connector is difficult, which may result in damage, misalignment, and/or shorted contacts between the FFC connector and/or mating connector. Furthermore, due to the ZIF or LIF connections, FFCs can be inadvertently disconnected during product shipment, thereby increasing service costs associated with investigating and correcting problems associated with the disconnected cable.

Accordingly, it would be desirable to provide an improved cable retention system.

SUMMARY

According to one embodiment, an information handling system (IHS), includes a chassis, a board coupled to the chassis, a board component coupled to the board, a board connector coupled to the board and electrically coupled to the board component, a cable retention subsystem, wherein the cable retention system includes a frame member, at least one board coupling member that is located on a first surface of the frame member and that is configured couple the frame member to the board, at least one frame alignment member located on a second surface of the base member that is opposite the first surface of the base member, and at least one frame retention member located on the second surface of the base member, and the IHS further includes a cable subsystem, wherein the cable subsystem includes a cable connector coupled to the board connector, and a cable alignment member, wherein the cable alignment member aligns the cable connector with the board connector when engaged with the frame alignment member, and wherein the at least one frame retention member is engaged with the cable connector to resist movement of the cable connector in a direction that is substantially perpendicular to the board.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
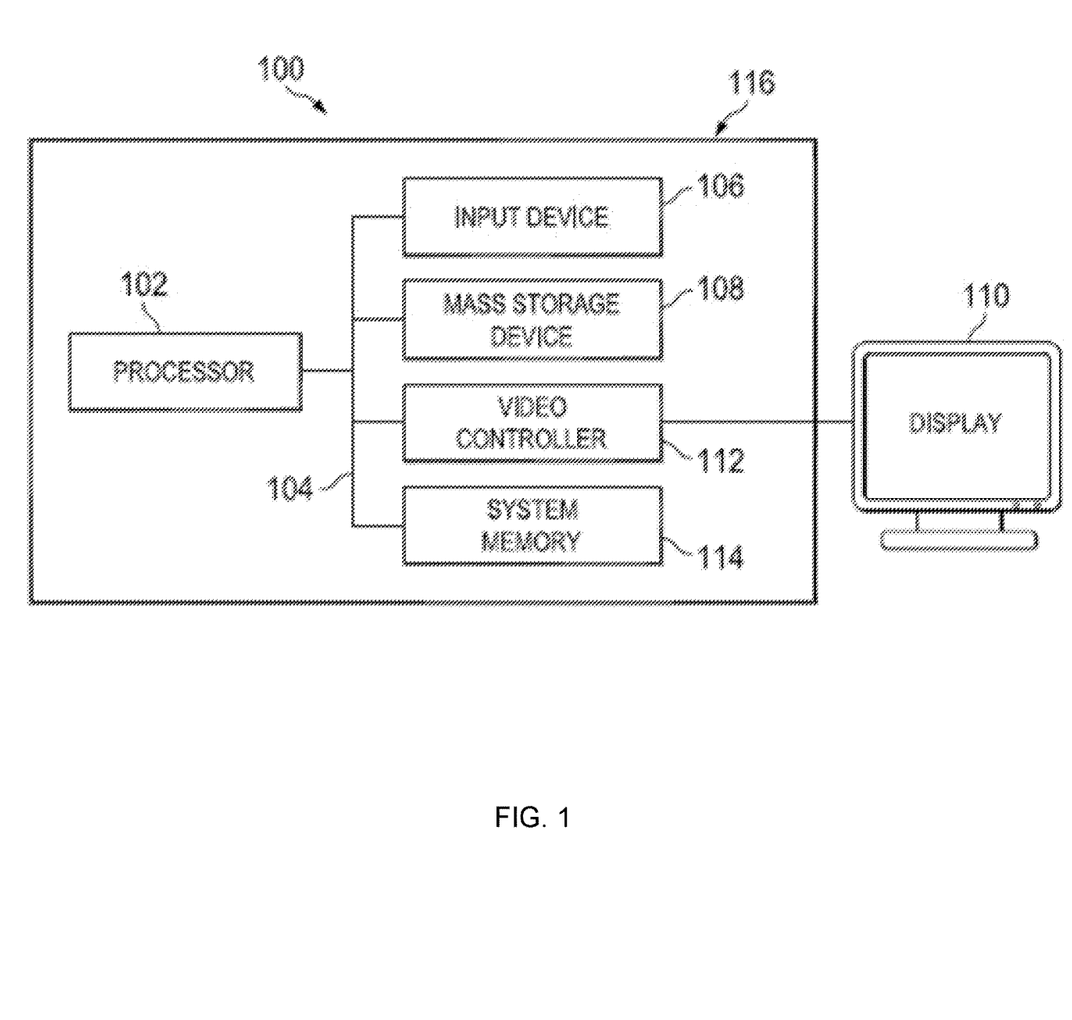
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2A:
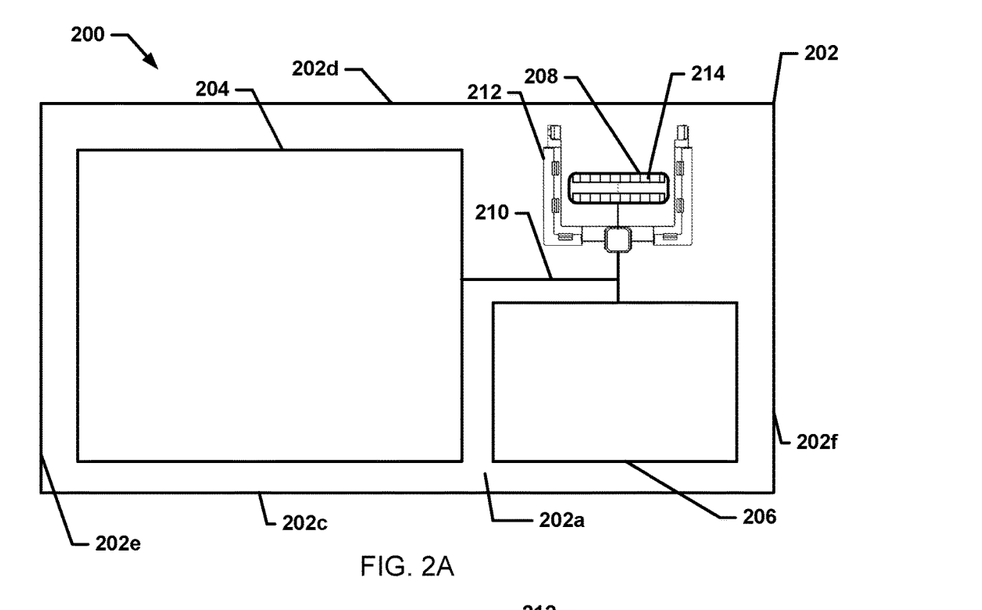
FIG. 2A is a top view illustrating an embodiment of a board.
Figure 2B:
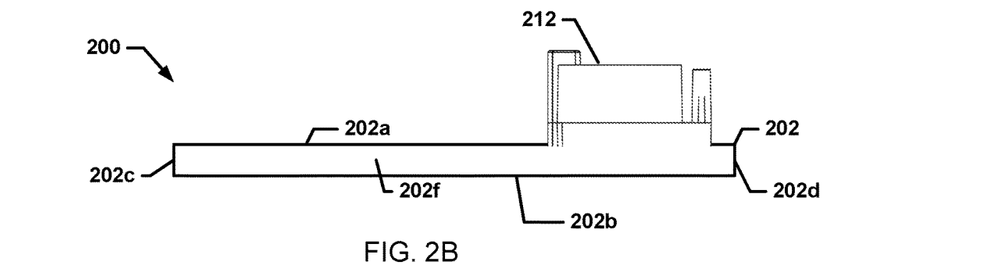
FIG. 2B is a side view illustrating an embodiment of the board of FIG. 2A.
Figure 2C:
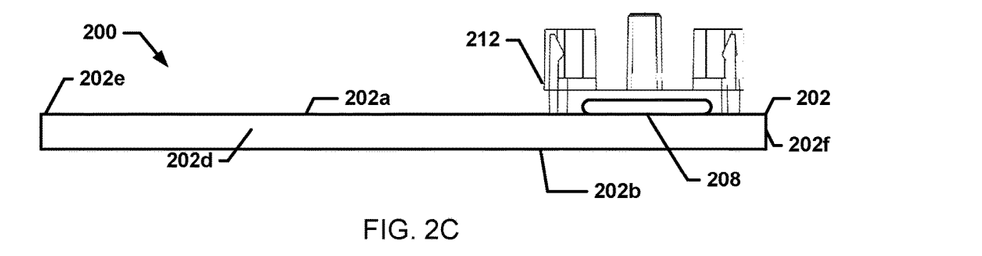
FIG. 2C is a front view illustrating an embodiment of the board of FIG. 2A.

Referring now to FIGS. 2A, 2B, and 2C, an embodiment of a board 200 is illustrated. In an embodiment, the board 200 may be provided in an IHS 100, described above with reference to FIG. 1, such that the board 200 includes and/or is electrically coupled to the processor 102, described above with reference to FIG. 1. In a specific embodiment, the board 200 is provided by a motherboard, although other types of boards are envisioned as falling within the scope of the present disclosure. The board 200 includes a board base 202 having a top surface 202a, a bottom surface 202b that is located opposite the board base 202 from the top surface 202a, a front edge 202c extending between the top surface 202a and the bottom surface 202b, a rear edge 202d located opposite the board base 202 from the front edge 202c and extending between the top surface 202a and the bottom surface 202b, and a pair of side edges 202e and 202f that are located opposite each other on the board base 202 and that each extend between the top surface 202a, the bottom surface 202b, the front edge 202c, and the rear edge 202d. In the illustrated embodiment, one or more board components such as, for example, a first board component 204 and a second board component 206 may be located on the top surface 202a of the board base 202. However, the board components 204 and 206 may be located on any surface or edge of the board base 202. The first board component 204 and the second board component 206 may include a variety of electrical and/or mechanical components that may be provided on the board 200 such as, for example, a processor socket for a processor, memory devices, a memory slot for a memory card, a basic input output system (BIOS), various types of controllers, a heat sink, a video card slot, power connectors, a northbridge, a southbridge, and/or other board components that would be apparent to one of skill in the art in possession of the present disclosure.

A board connector 208 may be included on the top surface 202a of the board base 202 and may be coupled to the board components 204 and/or 206 via a first communication bus 210. In specific embodiments, the board connector 208 may be a zero insertion force (ZIF) connector, a low insertion force (LIF) connector, and/or other board-to-wire connectors utilized with flexible flat cables (FFCs) or flexible printed circuits (FPCs) known in the art. However, other board connectors for round cables or flat cables (e.g., optical cable connectors, Universal Serial Bus (USB) connectors, Ethernet connectors, Serial AT Attachment (SATA) connectors, and/or other board connectors known in the art) may benefit from the teachings of the present disclosure and thus are envisioned as falling within its scope. While a single board connector 208 is illustrated, the board base 202 may include a plurality of board connectors while remaining within the scope of the present disclosure. Furthermore, the board connector 208 may be a male board connector or a board connector receptacle (i.e., female board connector), and may be oriented on the board 200 as an edge connector, a right angle connector, a vertical connector, and/or any other board connector orientation that would be apparent to one of skill in the art in possession of the present disclosure.

In various embodiments, the board connector 208 may include a plurality of board connector contact members 214 that may be located on the top surface in the board connector 208 and/or in a channel defined by the board connector 208 adjacent its top surface. As discussed below, each of the board connector contact members 214 may each be configured to engage a respective cable connector contact member in a cable connector when that cable connector is coupled with the board connector 208, allowing electrical communications between a cable subsystem and the board connector 208. The board connector contact members 214 may also be coupled to the board components 204 and/or 206 via the communication bus 210.

In an embodiment, a cable retention subsystem 212 may be located on the top surface 202a of the board base 202 and may be positioned relative to the board connector 208 such that the cable retention subsystem 212 is configured to engage and align a cable connector of a cable subsystem with the board connector 208 as that cable connector is moved towards the board connector 208 but prior to that cable connector engaging the board connector 208. The cable retention subsystem 212 may also be configured to retain the cable connector in engagement with the board connector 208 in order to maintain an electrical connection between the cable connector and the board connector 208 by resisting movement of the cable connector in a direction that is substantially perpendicular to and away from the board base 202 that would otherwise disconnect that cable connector from the board connector 208. While the cable retention subsystem 212 is illustrated as being on the top surface 202a of the board base 202, one of skill in the art in possession of the present disclosure will recognize that the cable retention subsystem 212 may be on any surface or edge of the board base 202 (e.g., the front edge 202c, the rear edge 202d, the side edges 202e, 202f, and the bottom surface 202b) upon which the board connector 208 is located, and may be provided in any orientation that allows alignment and retention of a cable connector with the board connector 208.

Figure 3A:
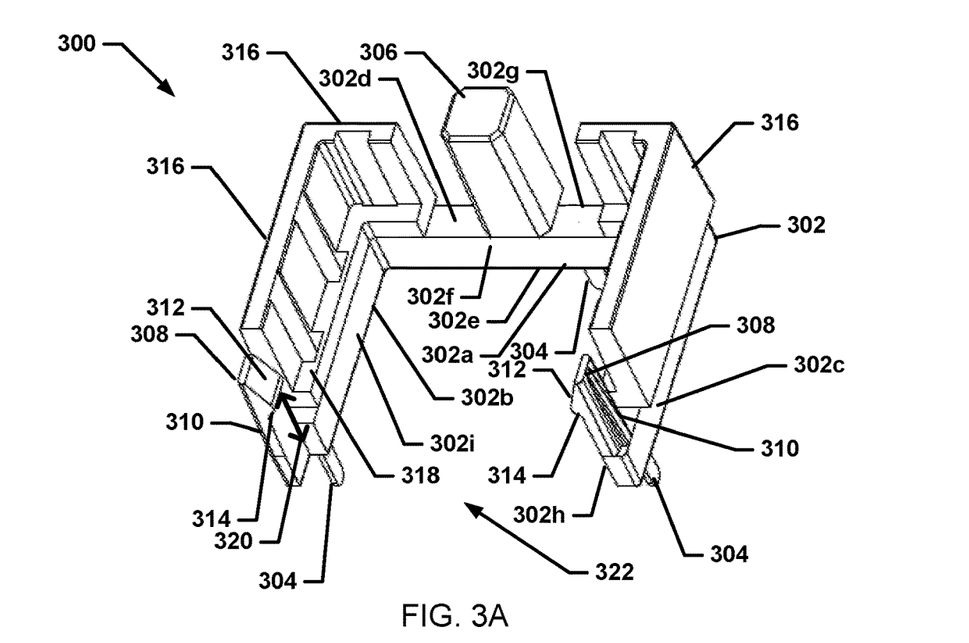
FIG. 3A is an isometric, top view illustrating an embodiment of a cable retention subsystem.
Figure 3B:
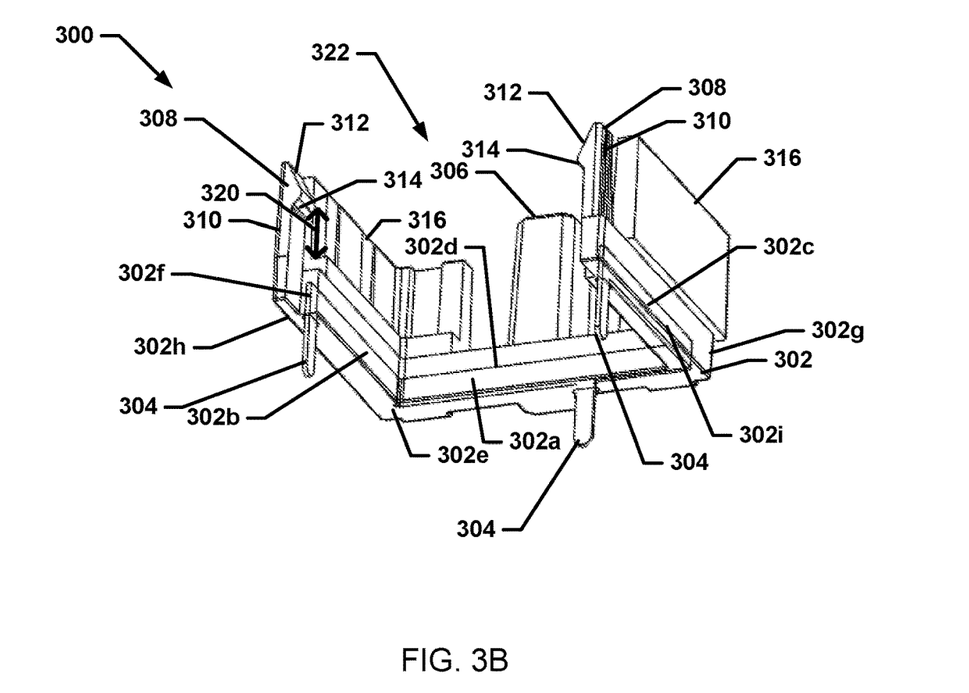
FIG. 3B is an isometric, bottom view illustrating an embodiment of the cable retention subsystem of FIG. 3A.

Referring now to FIGS. 3A and 3B, an embodiment of a cable retention subsystem 300 is illustrated that may be the cable retention subsystem 212 discussed above with reference to FIGS. 2A-2C. As such, the cable retention subsystem 300 may be a cable retention subsystem for an FFC. However, the cable retention subsystem 300 may be configured to align and retain cable connectors provided on a variety of other cables known in the art while remaining within the scope of the present disclosure. The cable retention subsystem 300 includes a frame member 302 having a frame back wall 302a and a plurality frame side walls 302b and 302c that extend substantially perpendicularly from opposite edges of the frame back wall 302a in a substantially parallel orientation to each other. Each frame wall 302a-302c may include a top surface 302d, a bottom surface 302e that is located opposite the frame member 302 from the top surface 302d, a front edge 302f extending between the top surface 302d and the bottom surface 302e, a rear edge 302g located opposite the frame member 302 from the front edge 302f and extending between the top surface 302d and the bottom surface 302e, and a pair of side edges 302h and 302i that are located opposite each other on the frame member 302 and that each extend between the top surface 302d, the bottom surface 302e, the front edge 302f, and the rear edge 302g. As illustrated in FIGS. 3A and 3B, each of the frame back wall 302a and/or the frame side walls 302b and 302c may include cable retaining features (e.g., apertures, latches, retaining walls, and/or other couplers or coupling elements) that are configured to provide for the retaining of a cable connector subsystem to the board connector 208 of FIGS. 2A-2C, as well as alignment features that are configured to align a cable connector of a cable subsystem with the board connector 208, as discussed in further detail below. While three frame walls 302a-302c are shown in the illustrated embodiment of the cable retention subsystem 300 in FIGS. 3A-3B, the frame member 302 may include a different number of frame walls or frame wall portions. For example, the frame member 302 may include a frame front wall that extends between the two frame side walls 302b and 302c and that is substantially parallel with the frame back wall 302a.

In an embodiment, at least one frame coupling member 304 is located on the bottom surface 302e of at least one of the frame walls 302a-302c. The frame coupling member 304 may be configured to couple the cable retention subsystem 300 to the board base 202. For example, in the illustrated embodiment, a plurality of frame coupling members 304 are provided by posts that extend from the bottom surface 302e such that the frame coupling members 304 may engage a board coupling member (e.g., an aperture, a receptacle, a post, etc) in a board base 202 of FIG. 2A-2C. The frame coupling members 304 may be soldered to the board base 202 to mount the cable retention subsystem 300 to the base board 202. However, while a specific example of frame coupling members 304 are illustrated, frame coupling member(s) may include an adhesive, a receptacle defined any of the frame walls 302a-302c for receiving a post extending from the board base 202, a screw, a snap, and any other couplers or coupling members that are configured to couple the frame member 302 of the cable retention subsystem 300 to the board base 202 of the board 200.

A frame alignment member 306 may be located on a top surface 302d of the frame member 302. In the illustrated embodiment, the frame alignment member 306 is an alignment post that extends from the top surface 302d of the frame back wall 302a. However, in other embodiments, the frame alignment member 306 may be an aperture defined by the frame member 302, or any other feature on the frame member 302 that provides the functionality of the frame alignment member 306 discussed below. As discussed further below, the frame alignment member 306 is configured to align a cable connector with the board connector 208 when the frame alignment member 306 is engaged with a cable alignment member included on that cable connector.

At least one frame retention member 308 may be included on the top surface 302d of the frame member 302. The frame retention member 308 may be configured to engage with a cable connector when the cable connector is coupled with the board connector 208, and may operate to resist movement of the cable connector in a direction that is substantially perpendicular to and away from the board 200 in order to prevent disconnection of the cable connector from the board connector 208. In the illustrated embodiment, the frame member 302 includes two frame retention members 308 that each include a post 310 that extends from the top surface 302d of the frame side walls 302b and 302c, respectively, and that are configured to provide a spring force towards each other. While two frame retention members 308 are illustrated, any number of frame retention members may be included in the cable retention subsystem 300 while remaining within the scope of the present disclosure. Each post 310 includes a first beveled edge 312 on a distal end of the post 310 that is opposite the post 310 from the frame member 302, and a second beveled edge 314 that is positioned adjacent to and below the first beveled edge 312. The first beveled edge 312 and the second beveled edge 314 are configured such that a cable connector engaging the first beveled edge 312 and/or the second beveled edge 314 as it moves along the length of the posts 310 can overcome the spring force provided by the posts 310 to allow for the insertion and removal of the cable connector, while also allowing that spring force to retain the cable connector in the cable retention subsystem 300. While a specific example of a frame retention member 308 is illustrated, other retention members including other features that would be apparent to one of skill in the art in possession of the present disclosure will still fall within its scope.

Furthermore, one or more retention walls 316 may extend from the top surfaces 302d of the frame walls 302a-302c. As discussed below, the retention walls 316 may be configured to resist movement of a cable connector in a direction that is substantially parallel with the board 200 and/or the board connector 208. The retention walls 316 may include a ledge 318 that may be configured to engage a cable connector, and the ledge 318 may also define a spacing 320 between that ledge 318 and the second beveled edge 314. The spacing 320 may be configured to be substantially the same as the width of the cable connector. In various embodiments, the retention walls 316 and frame member 302 may define a slot 322 through which a portion of a cable subsystem may be positioned when a cable connector is coupled to the board connector 208.

Figure 4A:
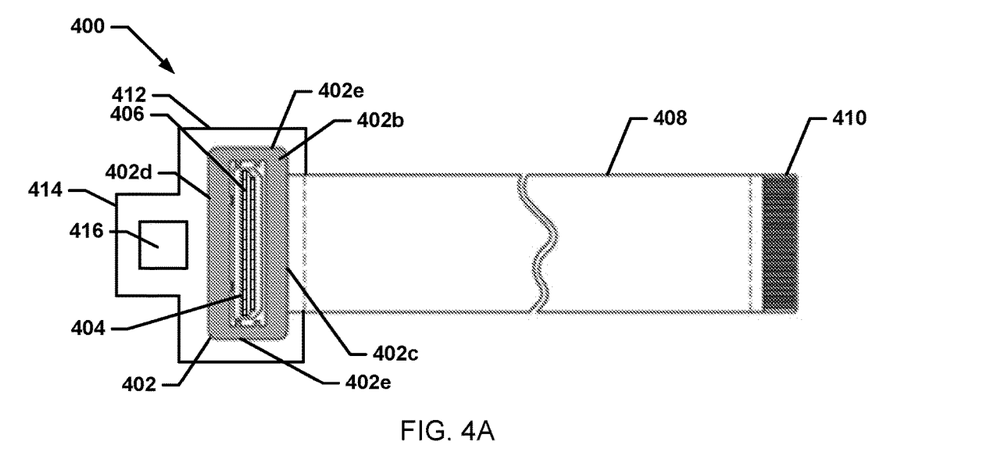
FIG. 4A is a bottom view illustrating an embodiment of a cable subsystem.
Figure 4B:
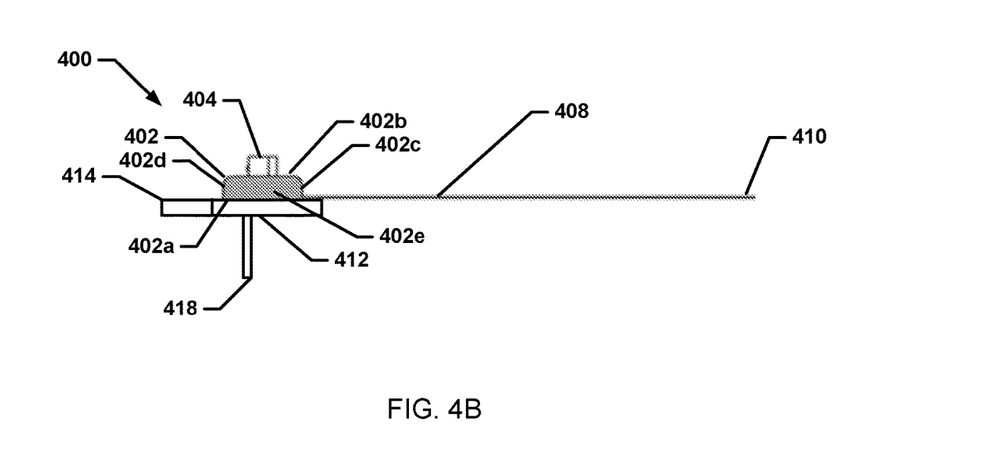
FIG. 4B is a side view illustrating an embodiment of the cable subsystem of FIG. 4A.

Referring now to FIGS. 4A and 4B, an embodiment of a cable subsystem 400 is illustrated. In a specific embodiment, the cable subsystem 400 may be a flat flexible cable (FFC) system or flexible printed circuit (FPC) system. However, other cable systems (e.g., "round" cable systems) may benefit from the teachings of the present disclosure and thus are envisioned as falling within its scope. The cable subsystem 400 includes a cable connector body 402 having a top surface 402a, a bottom surface 402b located opposite the cable connector body 402 from the top surface 402a, a front edge 402c extending from the top surface 402a and the bottom surface 402b, a rear edge 402d located opposite the cable connector body 402 from the front edge 402c and extending between the top surface 402a and bottom surface 402b, and a pair of opposing side edges 402e and 402f extending between the top surface 402a, the bottom surface 402b, the front edge 402c, and the rear edge 402d.

In the illustrated embodiment, a cable connector 404 may extend from the bottom surface 402b of the cable connector body 402 and may be a zero insertion force (ZIF) connector, a low insertion force (LIF) connector, and any other board-to-wire connectors utilized with flexible flat cables (FFCs) or flexible printed circuits (FPCs) known in the art. However, other cable connectors for round cables or flat cables (e.g., optical cable connectors, Universal Serial Bus (USB) connectors, Ethernet connectors, Serial AT Attachment (SATA) connectors, and/or other cable connectors known in the art) may benefit from the teachings of the present disclosure and thus are envisioned as falling within its scope. While a single cable connector 404 is illustrated, the cable connector body 402 may include a plurality of cable connectors while still falling within the scope of the present disclosure as well. Furthermore, the cable connector 404 may be a male connector or a cable connector receptacle (i.e., a female connector), and may extend from any surface or edge of the cable connector body 402.

In various embodiments, the cable connector 404 may include a plurality of cable connector contact members 406 that may be located on the bottom surface in the cable connector 404 or in a channel that is defined by the cable connector 404 adjacent the bottom surface. As discussed below, each of the cable connector contact members 406 may each be configured to engage a respective board connector contact member 214 in the board connector 208 when the cable connector 404 is coupled with the board connector 208, allowing electrical communications between the cable subsystem 400 and the board connector 208. The cable connector contact members 406 may also be coupled to a cable 408 that extends from the front edge 402c of the cable connector body 402. For example, the cable 408 may be a FFC or FPC, as illustrated, or a variety of other types of cables that would be apparent to one of skill in the art in possession of the present disclosure. The cable 408 may terminate at a second cable connector 410 which may include a cable connector body and cable connector that are substantially similar to the cable connector body 402 and cable connector 404, or as illustrated may be a cable edge connector or other cable subsystem that has features that are different than the cable connector body 402 and cable connector 404, and that is configured to couple the cable 408 to a board.

The cable subsystem 400 may include a cable connector alignment/retaining member 412 that is located on an edge or face of cable connector body 402 that is opposite the edge or surface upon which the cable connector 404 is located. In the illustrated embodiment, the cable connector alignment/retaining member 412 is located on the top surface 402a of the cable connector body 402 and may include a cable alignment feature 414 that extends from the rear edge 402d of the connector body. The cable alignment feature 414 may be configured to engage with the frame alignment member 306 of the cable retention subsystem 300 of FIG. 3. For example, the cable alignment feature 414 may define an aperture 416 that is configured to receive the frame alignment member 306 that includes a post. Furthermore, the cable connector alignment/retaining member 412 may be configured with a footprint that is substantially similar to the area of the cable retention subsystem 300 defined by the retention walls 316, and a width that is substantially similar to the spacing 320 defined between the ledge 318 and the second beveled edge 314 of the frame retention member 308. In an embodiment, a pull tab 418 may be located on the top surface 402a of the cable connector body 402. The pull tab 418 may be configured to be engaged to provide forces on the cable connector 404 for coupling and/or decoupling the cable connector 404 to/from a board connector 208.

Figure 5:
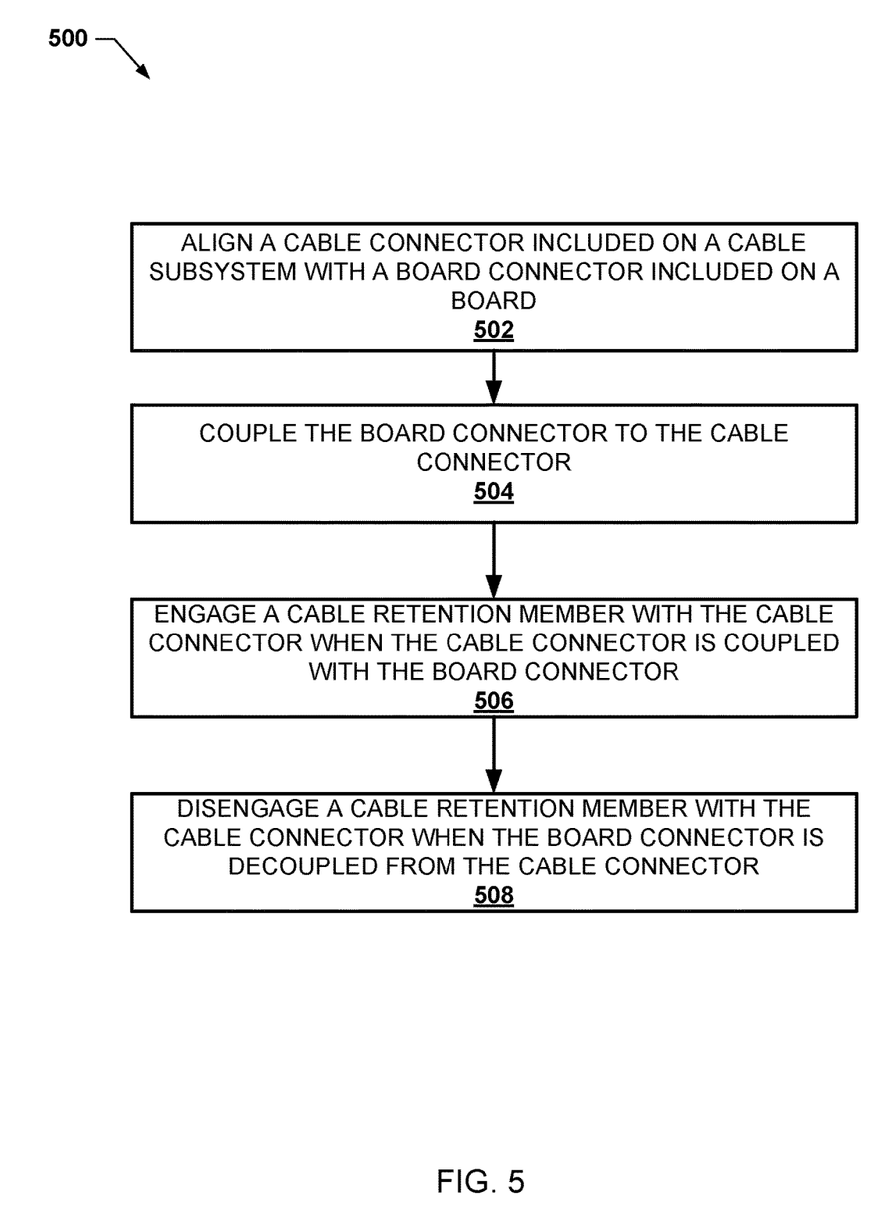
FIG. 5 is a flow chart illustrating an embodiment of a method for coupling a cable subsystem to a board using the cable retention subsystem.

Referring now to FIG. 5 an embodiment of a method 500 for coupling a cable subsystem to a board is illustrated. As discussed below, the systems and methods of the present disclosure provide a cable retention subsystem for aligning and retaining cable connectors on cable subsystems to board connectors on boards, and provide several benefits over the coupling of board connectors to cable connectors provided in conventional systems. As discussed above, connectors on FFCs are small, have limited stiffness, and often are configured for zero insertion force (ZIF) or low insertion force (LIF) connections. As such, discerning when an FFC connector is installed correctly is difficult, which may result in damage, shorting, and misalignment of the connector contact members. Furthermore, due to the ZIF or LIF connections, FFCs may inadvertently disconnect during product shipment, thus requiring extra service to diagnose and remedy the detached cable. Conventional ways of solving this these problems is including connectors with latches. However, such connectors are bulky and take up precious board real estate that is better serviced to populate with board components or reduce the size of the board. The cable retention subsystem of the present disclosure addresses these issues by providing for the alignment and enhanced retention of a cable connector when coupled with a respective board connector. The cable retention subsystem allows the user flexibility to position the cable retention subsystem around critical components that require the board space rather than implementing an industry standard connector to address the alignment and disconnection problems associated with ZIF or LIF connections. Furthermore, the cable retention system is "tool-less," which leads to improved serviceability compared to fasteners that require a tool (e.g., a screw) to secure a cable connector to the board.

Figure 6A:
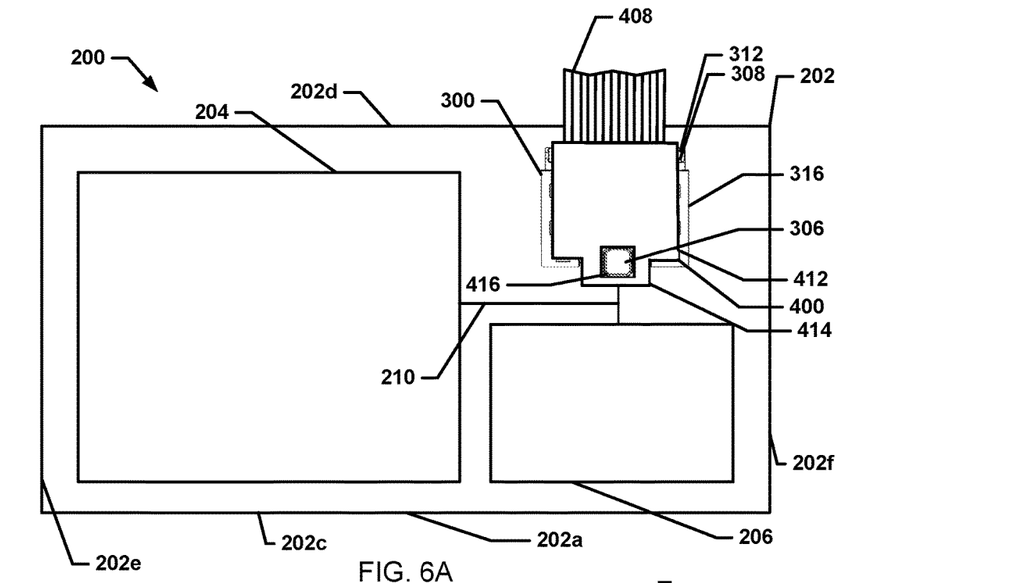
FIG. 6A is a top view illustrating an embodiment of the cable subsystem of FIGS. 4A and 4B engaging a frame alignment member of the cable retention subsystem of FIGS. 3A and 3B.
Figure 6B:
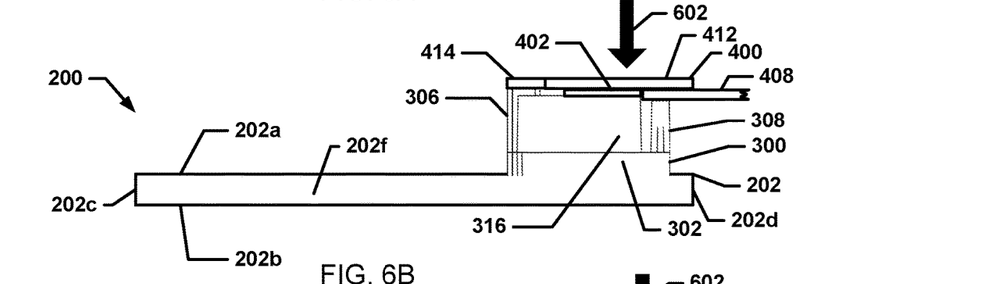
FIG. 6B is a side view illustrating an embodiment of the cable subsystem engaged with the cable retention subsystem of FIG. 6A.
Figure 6C:
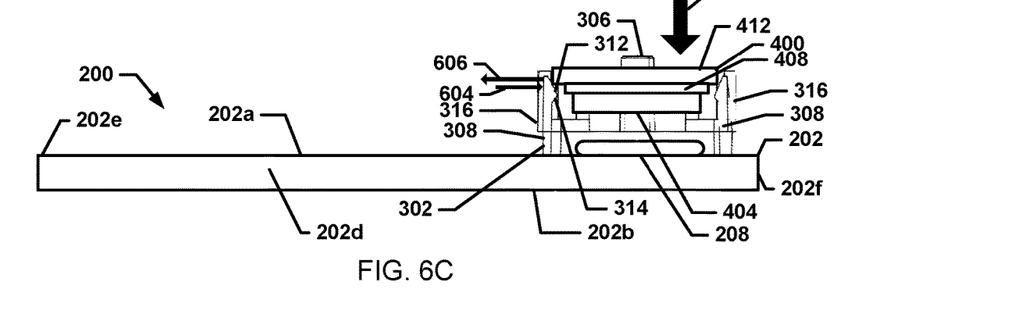
FIG. 6C is a front view illustrating an embodiment of the cable subsystem engaged with the cable retention subsystem of FIG. 6A.

The method 500 begins at block 502 where a cable connector included on a cable subsystem is aligned with a board connector included on a board when a frame alignment member included on the cable retention subsystem is engaged with a cable alignment member included on the cable connector. Referring to FIGS. 6A-6C, the board 200 of FIGS. 2A-2C including the cable retention subsystem 212/300 of FIGS. 3A and 3B may be provided. The cable subsystem 400 of FIGS. 4A and 4B may be engaged with the cable retention subsystem 300 so that the cable connector 404 on the cable subsystem 400 can be coupled to the board connector 208 on the board 200 and provide electrical communications to and/or from board components 204 and/or 206 (e.g., via the communication bus 210.) As illustrated, the cable subsystem 400 may be positioned adjacent the cable retention subsystem 300 and moved towards the cable retention subsystem 300 such that the cable connector alignment/retaining member 412 engages the cable retention subsystem 300. Specifically, the cable alignment feature 414 may engage the frame alignment member 306. As illustrated, at block 502 the aperture 416 of the cable alignment feature 414 may be aligned with the frame alignment member 306, and then moved towards the frame alignment member 306 such that the frame alignment member 306 is inserted into the aperture 416. The frame alignment member 306 and the cable alignment feature 414 may be configured such that, upon their engagement, each of the cable connector contact members 406 included on the cable connector 404 are aligned to engage a respective board connector contact member 214 included on the board connector 208 when the board connector 208 and the cable connector 404 are coupled together.

Figure 7A:
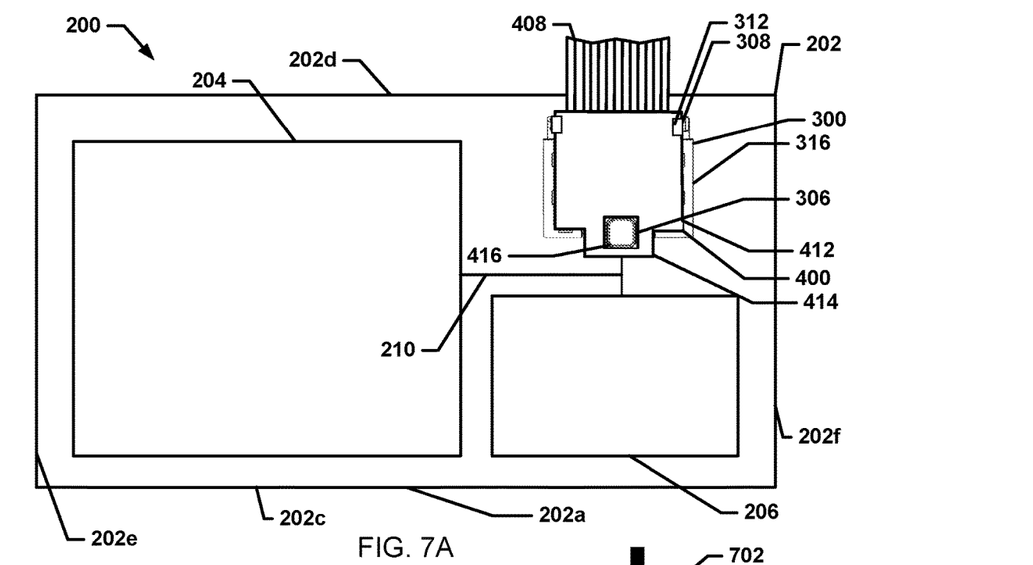
FIG. 7A is a top view illustrating an embodiment of the board of FIGS. 2A-2C coupled with the cable subsystem of FIGS. 4A and 4B.
Figure 7B:
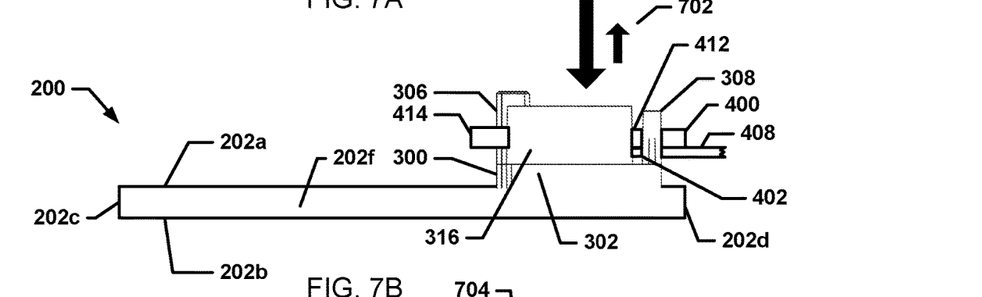
FIG. 7B is a side view illustrating an embodiment of the board coupled with the cable system of FIG. 7A.
Figure 7C:
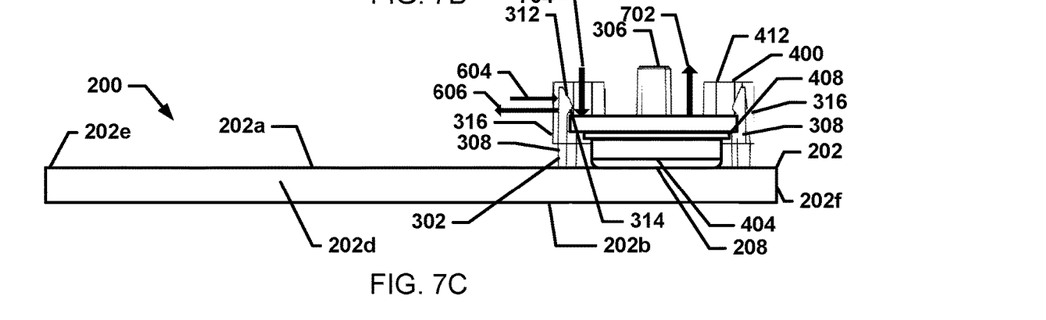
FIG. 7C is a front view illustrating an embodiment of the board coupled with the cable system of FIG. 7A.

The method 500 then proceeds to block 504 where the board connector is coupled with the cable connector. Referring to FIGS. 6A-6C and 7A-7C, after the cable connector 404 is aligned with the board connector 208 using the frame alignment member 306 on the cable retention subsystem 300, the cable connector/retaining member 412 may engage the frame retention members 308, and a force 602 may be applied to the cable connector alignment/retaining member 412 to overcome a spring force 604 provided by the frame retention members 308. For example, following the insertion of the frame alignment member 306 in the cable alignment feature 414, the cable connector alignment/retaining member 412 may engage the first beveled edges 312 on the frame retention members 308, and a force 606 may be applied to the cable connector alignment/retaining member 412 that is transmitted to the first beveled edges 312 and the frame retention members 308 that overcomes the spring force 604 provided by the frame retention members 308 and allows the frame retention member 308 to receive the cable connector alignment/retaining member 412. Once the frame retention member 308 receives the cable connector alignment/retaining member 412, the cable connector 404 may engage or otherwise couple with the board connector 208, as illustrated in FIGS. 7A-7C, and electrical signals may be transferred between the board connector 208 and cable connector 404. In an embodiment, the overcoming of the spring force provided by the frame retention members 308, and/or the positioning of the cable connector alignment/retaining member 412 in the spacing 320 between the ledge 318 and the second beveled edges 314 on the frame retention members 308, may be accompanied by an audible noise (e.g., a "click") that coincides with the engagement of the cable connector 404 and the board connector 408. As such, the cable retention subsystem 300 may provide for audible feedback of the connection of the cable connector 404 and the board connector 408, which may be particularly beneficial with cabling subsystems that otherwise do not produce such audible feedback.

The method 500 then proceeds to block 506 where a frame retention member engages with the cable connector when the cable connector is coupled with the board connector. Referring to FIGS. 7A-7C, when the frame retention member 308 engages the cable connector alignment/retaining member 412 when the cable connector 404 is coupled with the board connector 208, the frame retention member 308 is configured to resist movement of the cable connector 404 in a direction that is substantially perpendicular to and away from the board 200 such that the cable connector 404 is not disconnected from the board connector 208. For example, a force 702 may be applied to the cable connector that is in a direction that is away from the board 200. The force 702 may be a force that is greater than a force that is needed to decouple the cable connector 404 from the board connector 208 when the cable retention subsystem 300 is not present, and the frame retention member 308 operates to resist movement of the cable connector 404 in response to that force 702 by providing an opposing force 704 that is greater than and opposite to the force 702 to prevent the cable connector 404 from decoupling from the board connector 208.

In the illustrated example, the frame retention members 308 includes the second beveled edge 314 that is configured to resist movement of the cable connector alignment/retaining member 412 in a direction that is substantially perpendicular to and away from the board 200 in order to prevent the disconnection of the cable connector 404 from the board connector 208. Furthermore, the cable retention subsystem 300 also includes the retention walls 316 that operate to resist lateral movement of the cable connector alignment/retaining member 412 in a direction that is parallel with the board 200.

The method 500 then proceeds to block 508, where the cable connector is disengaged from the cable retention subsystem. Referring to FIGS. 6 and 7, at block 508 the cable connector alignment/retaining member 412 may be moved away from the board connector 208 by applying a threshold force to the second beveled edges 314 of the frame retention members 308 that overcomes the spring force, which causes the cable connector 404 to disengage from the board connector 208 and allows the cable connector alignment/retaining member 412 to be removed from the cable retention subsystem 300. For example the force provided at block 508 may generate a force 606 on the frame retention members 308 that overcomes the spring force 604, causing the frame retention members 308 to bend and release the cable connector alignment/retaining member 412 such that the cable connector 404 disconnects from the board connector 208 and the cable subsystem 400 goes from a board coupled state illustrated in FIGS. 7A-7C to a board decoupled state illustrated in FIGS. 6A-6C.

Thus, systems and methods have been described that provide for cable connector retention and alignment. Using the systems and method of the present disclosure, a cable retention subsystem may be configured to align and retain a cable connector of a cable subsystem when that cable connector is coupled to a board connector on a board. Conventional cable connectors and board connectors are easily decoupled during transport of a system in which they are included, and may be difficult to couple together, which can result in damage, shorts, and/or misalignment of the electrical contacts of those connectors. This is especially the case in FFCs. The systems and methods of the present disclosure provide a cable retention subsystem that aligns a cable connector on a cable subsystem to a respective board connector to provide for accurate and aligned connections, and then operates to resist the movement of the cable connector once it is coupled to the board connector.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A cable retention system, comprising:
   a frame member;
   at least one frame coupling member that is located on a first surface of the frame member and that is configured to couple the frame member to a board;
   a frame alignment member that is located on a second surface of the frame member that is opposite the first surface of the frame member, wherein the frame alignment member is configured to:
align a cable connector included on a cable subsystem with a board connector included on the board when the frame alignment member is engaged with a cable alignment member included on the cable connector;
at least one frame retention member that is located on the second surface of the frame member and that is configured to:
engage with the cable connector when the cable connector is coupled with the board connector; and
resist movement of the cable connector in a direction that is substantially perpendicular to the board; and
a retention wall that extends from the second surface, wherein the retention wall and the frame member define a slot through which a portion of the cable subsystem is positioned when the cable connector is couple to the board connector.

2. The cable retention system of claim 1, wherein the frame retention member is configured to:
resist movement of the cable connector in a direction that is substantially perpendicular to the board when a first force that is less than a threshold force is applied to the cable connector in the direction that is substantially perpendicular to the board; and
allow for disengagement of the cable connector from the board connector when a second force that is at least the threshold force is applied to the cable connector in the direction that is substantially perpendicular to the board.

3. The cable retention system of claim 2, wherein the cable connector includes a pull tab that is configured to transmit the first force and the second force.

4. The cable retention system of claim 1, wherein the cable subsystem is a flexible flat cable subsystem that includes a flexible flat cable extending from the cable connector.

5. The cable retention system of claim 1, wherein the retention wall is configured to resist movement of the cable connector in a direction that is substantially parallel with the board.

6. An information handling system (IHS), comprising:
a chassis;
a board coupled to the chassis;
a board component coupled to the board;
a board connector coupled to the board and electrically coupled to the board component;
a cable retention subsystem, wherein the cable retention subsystem comprises:
a frame member;
at least one frame coupling member that is located on a first surface of the frame member and that is configured couple the frame member to the board;
at least one frame alignment member that is located on a second surface of the frame member that is opposite the first surface of the frame member;
at least one frame retention member that is located on the second surface of the frame member; and
a retention wall that extends from the second surface; and
a cable subsystem, wherein the cable subsystem comprises:
a cable connector coupled to the board connector; and
a cable alignment member that aligns the cable connector with the board connector when the cable alignment member is engaged with the frame alignment member,
wherein the at least one frame retention member is engaged with the cable connector to resist movement of the cable connector in a direction that is substantially perpendicular to the board; and
wherein the retention wall and frame member define a slot through which a portion of the cable subsystem is positioned when the cable connector is coupled to the board connector.

7. The IHS of claim 6, wherein the frame retention member is configured to:
resist movement of the cable connector in a direction that is substantially perpendicular to the board when a first force that is less than a threshold force is applied to the cable connector in the direction that is substantially perpendicular to the board; and
allow for disengagement of the cable connector from the board connector when a second force that is at least the threshold force is applied to the cable connector in the direction that is substantially perpendicular to the board.

8. The IHS of claim 7, wherein the first force is greater than a third force that when applied to the cable connector in a direction that is substantially perpendicular to the board will decouple the cable connector from the board connector in the absence of the cable retention subsystem.

9. The IHS of claim 7, wherein the cable subsystem includes a pull tab coupled to the cable connector that is configured to transmit the first force and the second force.

10. The IHS of claim 6, wherein the cable subsystem is a flexible flat cable subsystem that includes a flexible flat cable extending from the cable connector.

11. The IHS of claim 6, wherein the retention wall is configured to resist movement of the cable connector in a direction that is substantially parallel with the board.

12. A method of securing a cable subsystem to a board comprising:
engaging a frame alignment member located on a first surface of a frame member included on a cable retention subsystem with a cable alignment member included on a cable connector of the cable subsystem, wherein the cable retention subsystem is coupled to a board;
aligning, via engagement of the frame alignment member and the cable alignment member, the cable connector with a board connector included on the board;
coupling the cable connector with the board connector by providing a portion of the cable subsystem through a slot defined by the frame member and a retention wall that extends from the first surface of the frame; and
engaging a frame retention member included on the cable retention subsystem with the cable connector when the cable connector is coupled with the board connector, wherein the frame retention member resists movement of the cable connector in a direction that is substantially perpendicular to the board.

13. The method of claim 12, wherein at least one frame coupling member located on a second surface of the frame member that is opposite the first surface of the frame member couples the cable retention subsystem to the board.

14. The method of claim 12, further comprising:
resisting, by the frame retention member, movement of the cable connector in a direction that is substantially perpendicular to the board when a first force that is less than a threshold force is applied to the cable connector in the direction that is substantially perpendicular to the board; and allowing, by the frame retention member, for disengagement of the cable connector from the board connector when a second force that is at least the threshold force is applied to the cable connector in the direction that is substantially perpendicular to the board.

15. The method of claim 14, wherein the first force is greater than a third force that when applied to the cable connector in a direction that is substantially perpendicular to the board will decouple the cable connector from the board connector in the absence of the cable retention subsystem.

16. The method of claim 12, wherein the cable subsystem is a flexible flat cable subsystem that includes a flexible flat cable extending from the cable connector.

17. The method of claim 12, further comprising:
resisting, by the retention wall, movement of the cable connector in a direction that is substantially parallel with the board when a force parallel to the board is applied to the cable subsystem.

* * * * *